(12) United States Patent
Clatanoff et al.

(10) Patent No.: US 10,606,018 B2
(45) Date of Patent: Mar. 31, 2020

(54) DISTRIBUTION CABLING TAPE AND SYSTEM

(71) Applicant: Corning Research & Development Corporation, Corning, NY (US)

(72) Inventors: William J. Clatanoff, Austin, TX (US); Donald K. Larson, Cedar Park, TX (US); Daniel J. Treadwell, Austin, TX (US); Zachary M. Thompson, Austin, TX (US); Tommie Wilson Kelley, Shoreview, MN (US); Thomas P. Hedblom, Eagan, MN (US); Susannah C. Clear, Hastings, MN (US); Cary A. Kipke, Austin, TX (US)

(73) Assignee: Corning Research & Development Corporation, Corning, NY (US)

( * ) Notice: Subject to any disclaimer, the term of this patent is extended or adjusted under 35 U.S.C. 154(b) by 11 days.

(21) Appl. No.: 15/651,557

(22) Filed: Jul. 17, 2017

(65) Prior Publication Data
US 2018/0017750 A1     Jan. 18, 2018

Related U.S. Application Data

(60) Provisional application No. 62/363,610, filed on Jul. 18, 2016.

(51) Int. Cl.
*G02B 6/44* (2006.01)
*C09J 7/22* (2018.01)
(Continued)

(52) U.S. Cl.
CPC .............. *G02B 6/4459* (2013.01); *C09J 7/22* (2018.01); *C09J 7/38* (2018.01); *E01C 11/00* (2013.01);
(Continued)

(58) Field of Classification Search
CPC ..... Y10T 428/28; C09J 2203/302; C09J 7/02; C09J 7/20; C09J 7/22; E04F 13/042; E04F 13/06; H02G 9/00; H02G 9/02; H02G 9/025; H02G 9/06; H02G 9/065; H02G 3/305; H02G 3/383; H02G 3/36;
(Continued)

(56) References Cited

U.S. PATENT DOCUMENTS 4,093,499 A * 6/1978 Naka ..................... E04F 11/163
156/244.27
4,117,192 A    9/1978 Jorgensen
(Continued)

FOREIGN PATENT DOCUMENTS

WO    WO 2016-205443    12/2016

OTHER PUBLICATIONS

Partial International Search Report for PCT/US2017/042375, dated Sep. 25, 2017, 3 pp.

*Primary Examiner* — Catherine A. Simone
(74) *Attorney, Agent, or Firm* — William D. Doyle

(57) ABSTRACT

A distribution cabling tape comprises a resilient polymeric base sheet having a first major surface and a second major surface, the first major surface having a continuous lengthwise channel formed in a first portion thereof. The tape also includes an adhesive layer disposed on a second and third portion of the first major surface, the adhesive layer capable of adhering to a concrete or asphalt surface, such as a road, curb, or walkway.

12 Claims, 10 Drawing Sheets

(51) Int. Cl.
  *H02G 3/30* (2006.01)
  *H02G 3/00* (2006.01)
  *C09J 7/38* (2018.01)
  *H02G 9/02* (2006.01)
  *E01C 11/00* (2006.01)

(52) U.S. Cl.
  CPC ........... *G02B 6/4466* (2013.01); *H02G 3/305* (2013.01); *H02G 9/025* (2013.01); *C09J 2201/16* (2013.01); *C09J 2201/606* (2013.01); *C09J 2203/302* (2013.01); *H02G 3/266* (2013.01)

(58) Field of Classification Search
  CPC .......... H02G 3/26; H02G 3/266; H02G 3/263; G02B 6/504; G02B 6/4441; G02B 6/4451; G02B 6/4459; F21B 47/12; F16L 3/00; F16L 3/08; F16L 3/02; F16L 3/12; F16L 3/127; F16L 3/1207; F16L 3/137; F16L 3/01; F16L 3/04; F16L 3/1036; B32B 7/12; B32B 7/14; B32B 3/30; H01B 7/185
  USPC ........................ 428/40.1, 343, 354, 188, 156
  See application file for complete search history.

(56) References Cited

U.S. PATENT DOCUMENTS

| | | |
|---|---|---|
| 4,129,673 A | 12/1978 | Eigenmann |
| 4,282,281 A | 8/1981 | Ethen |
| 4,313,991 A * | 2/1982 | Lamb ..................... E04F 13/04 428/131 |
| 4,388,359 A | 6/1983 | Ethen et al. |
| 4,490,432 A | 12/1984 | Jordan |
| 4,681,401 A | 7/1987 | Wyckoff |
| 4,685,824 A | 8/1987 | Eigenmann |
| 4,911,525 A * | 3/1990 | Hicks ..................... G02B 6/32 385/114 |
| 4,988,541 A | 1/1991 | Hedblom |
| 5,077,117 A | 12/1991 | Harper et al. |
| 5,227,221 A | 7/1993 | Hedblom |
| 5,278,356 A | 1/1994 | Miller |
| 5,453,320 A | 9/1995 | Harper et al. |
| 5,593,246 A | 1/1997 | Hedblom et al. |
| 5,683,746 A | 11/1997 | Hedblom et al. |
| 5,702,994 A | 12/1997 | Klosel |
| 5,763,000 A | 6/1998 | Hedblom |
| 5,853,846 A | 12/1998 | Clark et al. |
| 5,906,883 A * | 5/1999 | Blanc-Brude ........... B44C 1/105 428/178 |
| 5,906,889 A | 5/1999 | Miron |
| 5,928,761 A | 7/1999 | Hedblom et al. |
| 5,981,033 A | 11/1999 | Haunschild et al. |
| 6,431,788 B1 | 8/2002 | Hedblom et al. |
| 6,479,132 B2 | 11/2002 | Hedblom et al. |
| 6,718,101 B2 | 4/2004 | Le Noane et al. |
| 7,095,930 B2 | 8/2006 | Storaasli et al. |
| 7,169,831 B2 | 1/2007 | Helland et al. |
| 9,062,423 B2 | 6/2015 | Allouche et al. |
| 2011/0030190 A1 | 2/2011 | Larson et al. |
| 2013/0098674 A1 | 4/2013 | Shoemaker et al. |
| 2013/0223807 A1 | 8/2013 | Elford et al. |
| 2014/0011911 A1 | 1/2014 | Hedblom |
| 2014/0153893 A1 | 6/2014 | Berglund et al. |
| 2015/0310964 A1 | 10/2015 | Larson et al. |
| 2017/0326837 A1* | 11/2017 | Wang ..................... B32B 37/003 |

\* cited by examiner

DISTRIBUTION CABLING TAPE AND SYSTEM

BACKGROUND

Field of the Invention

The present invention is directed to a distribution cabling tape or protective adhesive-backed structure and system for an asphalt or concrete surface, such as a road, curb, or walkway, that protects cabling, wires, splices, and other telecommunications network devices.

Related Art

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

With many players competing in the industry, speed to build new networks is critical. However, the process to deploy traditional fiber optic networks often requires time consuming civil engineering work both in planning, verifying existing infrastructure location and construction. The access network can be the most burdensome in that individual fibers must connect each subscriber's living unit. In the case of single family home neighborhoods, that means a single fiber to each home.

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly (about a day to install the distribution cable for a serving area of 200-500 homes). However, for new entrants for fiber-to-the-home (FTTh) service, gaining access to the telephone poles from the pole owner (often incumbent telephone company) can be a time consuming and litigious process.

For below grade deployments (conduit below grade in which to pull the distribution cable) deployment can involve many construction machines and operators for weeks for a serving area of 200-500 homes. One of the most time consuming operations is directional drilling to place the conduit below grade. The cost of directional drilling is approximately $40/foot making below grade fiber access network deployment cost much more than aerial deployments.

Therefore, need exists for a distribution cabling alternative to traditional aerial and below grade installations that can eliminate the need to share telephone poles and avoid the time consuming and costly directional drilling for conduit placement.

SUMMARY

According to one embodiment of the present invention, a distribution cabling tape comprises a resilient polymeric base sheet having a first major surface and a second major surface, the first major surface having a continuous lengthwise channel formed in a first portion thereof. The tape also includes an adhesive layer disposed on a second and third portion of the first major surface, the adhesive layer capable of adhering to a concrete or asphalt surface.

According to another embodiment of the invention, a distribution cabling tape comprises a resilient polymeric base sheet having a first major surface and a second major surface. The tape further includes an adhesive layer disposed on first and second portions of the first major surface, the adhesive layer capable of adhering to an asphalt or concrete surface, wherein the adhesive layer further includes a continuous lengthwise channel formed therein, between the first and second portions along the first major surface, wherein the channel is configured to receive at least a portion of a distribution cable.

According to another embodiment of the invention, a distribution cabling tape comprises a resilient polymeric base sheet having a first major surface and a second major surface, the first major surface being substantially continuous across a side to side width of the tape; and an adhesive layer disposed on a first and a second portion of the first major surface, the adhesive layer capable of adhering to a concrete or asphalt surface, wherein the distribution cabling tape includes wing portions that taper to a narrower base sheet thickness at side ends of the distribution cabling tape.

According to another embodiment of the invention, a distribution cabling tape comprises a resilient polymeric base sheet having a first major surface and a second major surface, the first major surface being substantially continuous across a side to side width of the tape, wherein the resilient polymeric base sheet comprises a composite of at least two different materials; and an adhesive layer disposed on a first and a second portion of the first major surface, the adhesive layer capable of adhering to a concrete or asphalt surface, wherein a portion of the distribution cabling tape is configured to receive at least a portion of at least one distribution cable.

According to another embodiment of the invention, a distribution cabling system comprises a distribution cabling tape having a resilient polymeric base sheet having a first major surface and a second major surface, the first major surface having a continuous lengthwise first channel formed in a first portion thereof, and an adhesive layer disposed on a second portion of the first major surface, the adhesive layer capable of adhering to a concrete or asphalt surface. The system further includes a second channel formed in the concrete or asphalt. The system also includes a distribution cable at least partially disposed in both the first and second channels.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
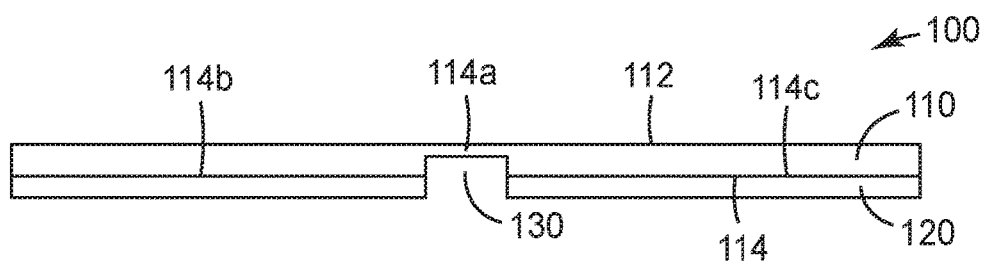
FIGS. 1A-1C and 1E-1I are cross section views of distribution cabling tapes according to different aspects of the invention and FIG. 1D is a perspective view of the adhesive backed road surface tape shown in FIG. 1B.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a durable, protective distribution cabling tape that includes or covers a conduit for distribution cable, such as fiber optic network cable. The distribution cabling tape is configured to adhere to an asphalt or concrete surface, such as a road, curb, walkway, bridge support, building base or other foundation. In one aspect, the distribution cabling tape comprises a pavement marking tape that further includes a channel formed in the backing layer that is configured to receive at least a portion of a distribution cable. In another aspect, the distribution cabling tape comprises a pavement marking tape that further includes a channel formed in the adhesive layer that is configured to receive at least a portion of a distribution cable, which can include copper wire(s) and/or optical fiber(s). In another embodiment, the distribution cabling tape includes tapered wing portions that are less susceptible to damage and can accommodate a more contoured road or other mounting surface. In another embodiment, the distribution cabling tape can be formed from a composite material. In yet another aspect, the distribution cabling tape houses a fiber optic cable within the construction of the tape. Optionally, the road, curb, or walkway surface may include a separate channel formed therein to receive the distribution cable (or at least a portion thereof) and/or the entire (or at least a portion of) adhesive-backed structure or tape. Other distribution cabling tapes can include some or all of the aforementioned features in combination.

FIG. 1A shows a first aspect of the invention, a distribution cabling tape 100 (also referred to herein as a road surface conduit) that includes a durable, resilient polymeric base sheet 110 having a first major surface 114 and a second major surface 112. The first major surface 114 includes a continuous lengthwise channel 130 formed in a first portion 114a thereof. The channel 130 is configured to receive at least a portion of a distribution cable, such as cable 150 shown in FIG. 1C. While a single channel 130 is shown in FIG. 1A, in other aspects of the invention, a distribution cabling tape can include multiple channels (see e.g., FIG. 1E). In addition, tape 100 includes an adhesive layer 120 disposed on a second portion 114b and a third portion 114c of the first major surface 114. In one aspect, the adhesive layer 120 comprises a composition that is capable of adhering to a concrete or asphalt (or asphalt-concrete hybrid) surface, such as a road, curb or walkway surface, such as road 105 shown in FIG. 1C. In some aspects, the channel 130 is adhesive free. In other aspects, the channel 130 may include some amount of adhesive in it to help hold the distribution cable in place during deployment. In another aspect, the adhesive layer 120 can comprise a composition that is capable of adhering to an alternative road surface, such as a cobblestone or brick surface.

It is noted that while structure 100 is referred to herein as a "tape," this term is not meant to exclude other types of adhesive-coated structures, such as adhesive-coated road patches, panels or markers that can provide a protective conduit or other type of pathway for cables. In addition, the distribution cabling tape can also provide a protective pathway for electrical or power lines that are to be distributed through a neighborhood, or across a road, curb, street, parking lot or sidewalk, or for cabling repairs and/or splices. Moreover, the adhesive can be selected to provide either a temporary or more permanent type of bond to the road, curb, or walkway, thus providing a distribution cabling solution for short term events (such as concerts, sporting events, festivals, and the like), or for more longer duration deployment situations (such as subdivisions in development). In addition, while the tape embodiments described herein are often used in road, curb, sidewalk, or street applications, in alternative embodiments, the distribution cabling tape can be used to distribute cabling along other surfaces, such as along or up the side of a building, tower, bridge, or other structures. Further, while cable 150 is described herein as a distribution cable, tape 100 can be used to route and/or protect many different types of cables, including communication cables, power cables (such as low voltage power cables), sensor wires, co-axial cables, signal cables, and other conventional cables, or other types of equipment, such as sensors, RFID tags, embedded antennas, antenna feeds, and location markers.

Figure 1B:
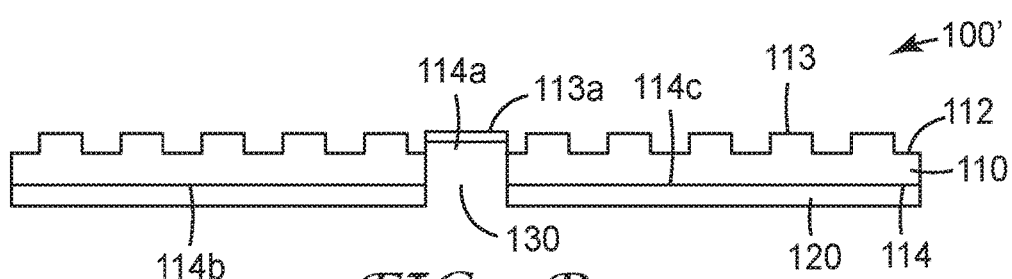

FIG. 1B shows another aspect of the invention, a distribution cabling tape 100' that includes a resilient polymeric base sheet 110 having a first major surface 114 and a second major surface 112 that comprises a patterned surface 113 having a plurality of raised structures. The first major surface 114 includes a continuous lengthwise channel 130 formed in a first portion 114a thereof. The channel 130 is configured to receive at least a portion of a distribution cable, such as cable 150 shown in FIG. 1C. While FIG. 1B shows that channel 130 is co-located with a raised pattern structure, in other aspects, channel 130 may not be co-located with a raised pattern surface structure. In this aspect, the channel 130 is co-located with a lengthwise raised structure 113a so that the overall height of the tape 100' is not altered by the inclusion of the channel 130 and/or cable 150. In addition, tape 100' includes an adhesive layer 120 disposed on a second portion 114b and a third portion 114c of the first major surface 114. The adhesive layer comprises a composition that is capable of adhering to a concrete or asphalt surface, such as a road, curb, or walkway surface, such as road 105 shown in FIG. 1C. FIG. 1D is a perspective view of adhesive-backed structure or tape 100'.

Figure 1C:
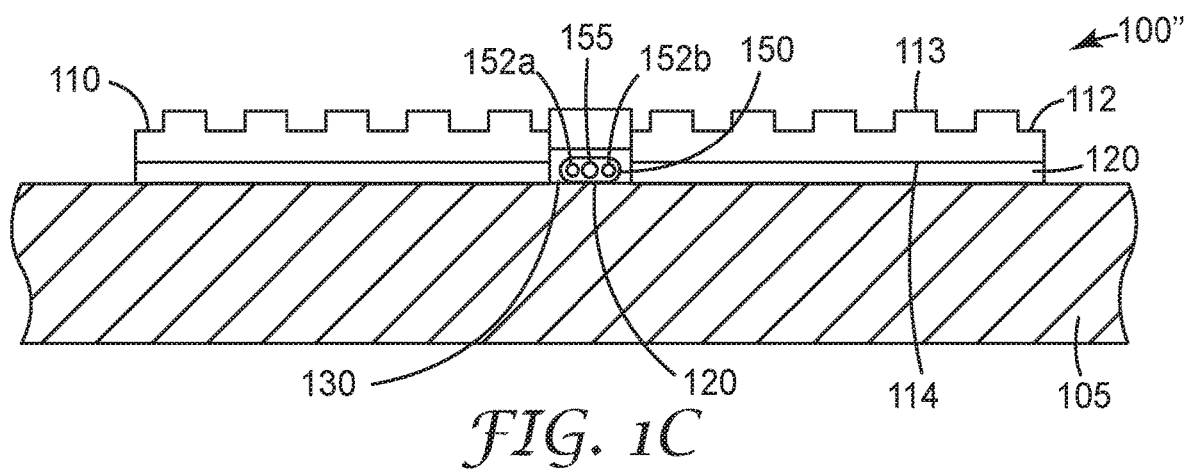
Figure 1D:
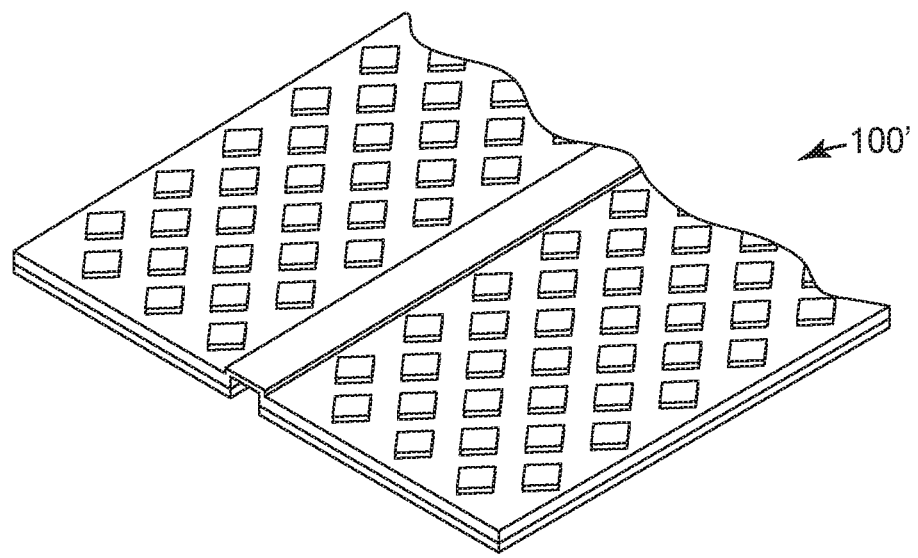

FIG. 1C shows another aspect of the invention, a distribution cabling tape 100" that includes a resilient polymeric base sheet 110 having a first major surface 114 and a second major surface 112 that comprises a patterned surface 113 having a plurality of raised structures. The first major surface 114 includes a continuous lengthwise channel 130 formed in a first portion 114*a* thereof. The channel 130 is configured to receive at least a portion of a distribution cable 150. In this aspect, the distribution cable 150 includes one or more electrical lines or optical fibers 155. In some aspects, cable 150 can include one or more strength members 152*a*, 152*b*, such as is present in commercially available cable, such as 3M™ Clear Fiber Drop Cable (available from 3M Company, St. Paul Minn.), ROC™ Drop Dielectric Cable (available from Corning Inc., Hickory N.C.). Other suitable cables include CampusLink™ Indoor/Outdoor cable (available from Prysmian Group, Lexington, S.C.). In this aspect, the channel 130 may be co-located with a lengthwise raised structure so that the overall height of the tape 100' is not altered. Alternatively, in some aspects, the distribution cable 150 can comprise a conventional ribbon fiber having multiple fibers or a series of parallel optical fibers disposed on a filament tape to allow straightforward access to separate individual fibers by peeling off a portion of the filament tape. As such, the distribution cable 150 can have a circular, oval, or rectangular cross section profile. In other alternative embodiments, channel 130 can be configured to accommodate more than one distribution cable, such as cable 150.

In addition, tape 100" includes an adhesive layer 120 disposed on a second portion 114*b* and a third portion 114*c* of the first major surface 114. The adhesive layer comprises a composition that is capable of adhering to an asphalt or concrete surface, such as a road, curb, or walkway surface 105.

Figure 1E:
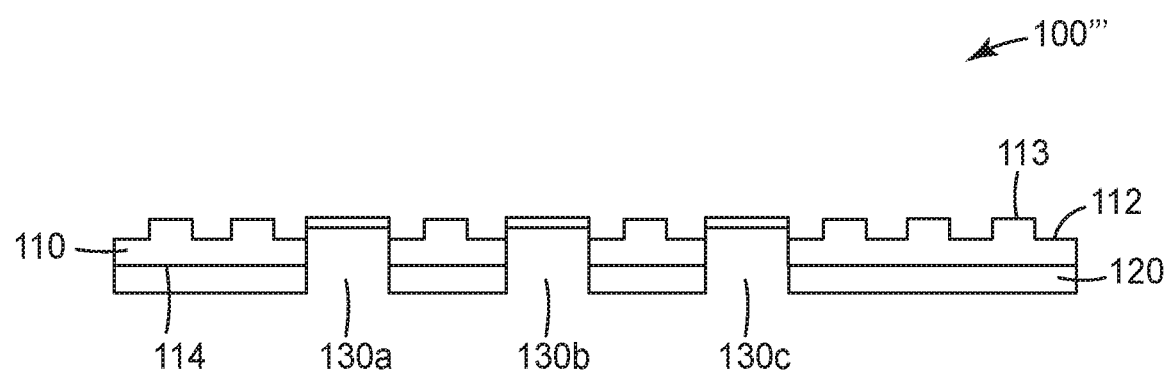

FIG. 1E shows yet another aspect of the invention, a distribution cabling tape 100''' that includes a resilient polymeric base sheet 110 having a first major surface 114 and a second major surface 112 that comprises a patterned surface 113 having a plurality of raised structures. The first major surface 114 includes multiple continuous lengthwise channels, 130*a*, 130*b*, and 130*c* formed in a first portion thereof. Of course, depending on the application, a fewer number (e.g., 2) or a greater number (e.g., 4, 5) of channels can be formed in the first major surface of the base sheet 110. The channels 130*a*-130*c* are each configured to receive at least a portion of a distribution cable, such as cable 150 shown in FIG. 1C. While FIG. 1E shows that channels 130*a*-130*c* are each co-located with a raised pattern structure, in other aspects, channels 130*a*-130*c* may not be co-located with a raised pattern surface structure in other embodiments. In this aspect, the channels 130*a*-130*c* are each co-located with a lengthwise raised structure so that the overall height of the tape 110''' is not altered by the inclusion of the channels 130*a*-130*c* and/or the inserted cables. In addition, tape 100''' includes an adhesive layer 120 disposed on remaining portions of the first major surface 114. The adhesive layer comprises a composition that is capable of adhering to a concrete or asphalt surface, such as a road, curb, or walkway surface, such as road 105 shown in FIG. 1C.

Figure 1F:
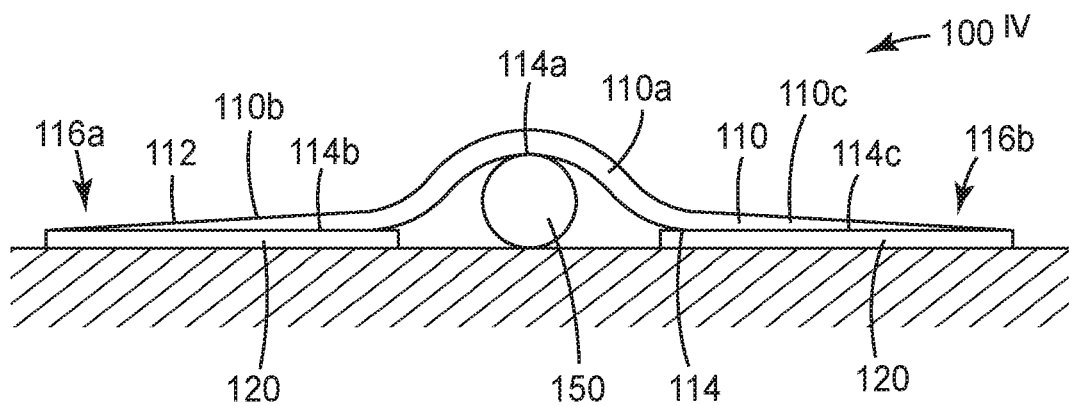

FIG. 1F shows another aspect of the invention, a distribution cabling tape 100$^{iv}$ that includes a resilient polymeric base sheet 110 having a first major surface 114 and a second major surface 112. In this embodiment, the first major surface 114 is substantially continuous across the side to side width of the tape 100$^{iv}$. In this embodiment, a first portion 114*a* of the surface 114 is not covered with an adhesive layer. In an alternative embodiment, first portion 114*a* can be coated with an adhesive layer.

The portion 114*a* is configured to accommodate at least a portion of at least one distribution cable, such as cable 150, similar to those described above. In addition, tape 100$^{iv}$ includes an adhesive layer 120 disposed on a second portion 114*b* and a third portion 114*c* of the first major surface 114. The adhesive layer comprises a composition that is capable of adhering to a concrete or asphalt surface, such as a road, curb, or walkway surface, such as road 105 shown in FIG. 1C. Further, in this embodiment, tape 100$^{iv}$ includes wing portions 116*a* and 116*b* that taper to a narrower base sheet thickness at the tape side ends. In this manner, the outer edges of the tape can be less susceptible to damage and can accommodate a more contoured road or other mounting surface.

In an alternative embodiment, resilient polymeric base sheet 110 can be formed from a single material, or, alternatively, different materials. For example, as shown in FIG. 1F, a first portion 110*a* of polymeric base sheet 110 can be formed from a first material, such as a toughened or semi-rigid polymer material and second and third portions 110*b*, 110*c* of polymeric base sheet 110 can be formed from a different material, such as a more flexible elastomeric (lower modulus) material. Such a composite base sheet 110 can be formed by coextruding the two different polymers, as would be apparent to one of skill in the art given the present description.

Figure 1G:
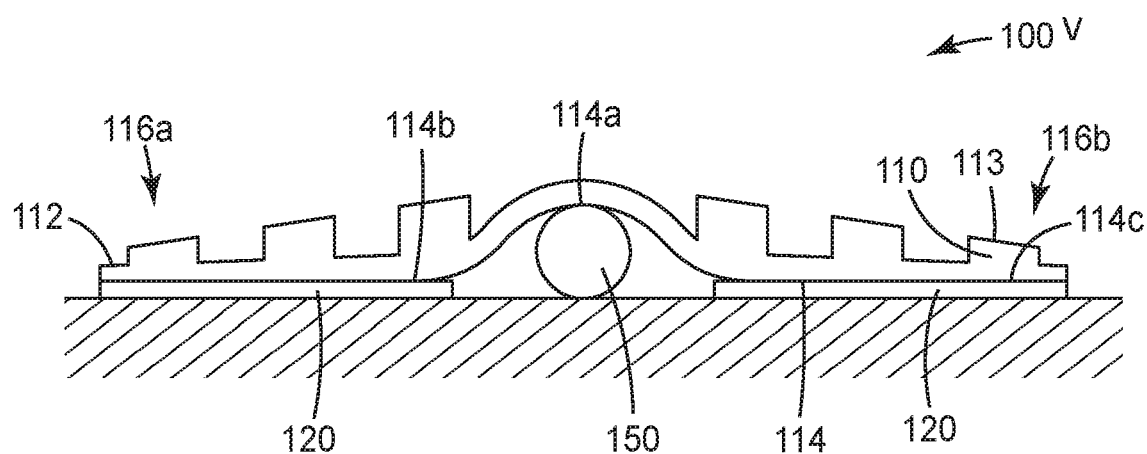

FIG. 1G shows another aspect of the invention, a distribution cabling tape 100$^{v}$ that includes a resilient polymeric base sheet 110 having a first major surface 114 and a second major surface 112 that comprises a patterned surface 113 having a plurality of raised structures. The resilient polymeric base sheet 110 can be formed from a single material or a coextrusion of multiple materials, such as described above.

In this embodiment of FIG. 1F, the first major surface 114 is substantially continuous across the side to side width of the tape 100$^{v}$. A first portion 114*a* of the surface 114 is not covered with an adhesive layer. First portion 114*a* can accommodate at least a portion of a distribution cable, such as cable 150, similar to those described above. In alternative embodiments, raised structures can be included (or not included) over the tape region covering cable 150. In addition, tape 100$^{v}$ includes an adhesive layer 120 disposed on a second portion 114*b* and a third portion 114*c* of the first major surface 114. The adhesive layer comprises a composition that is capable of adhering to a concrete or asphalt surface, such as a road, curb, or walkway surface, such as road 105 shown in FIG. 1C. Further, in this embodiment, tape 100$^{v}$ includes wing portions 116*a* and 116*b* that taper to a narrower base sheet thickness at the tape side ends. In this manner, the outer edges of the tape can be less susceptible to damage and can accommodate a more contoured road or other mounting surface.

Figure 1H:
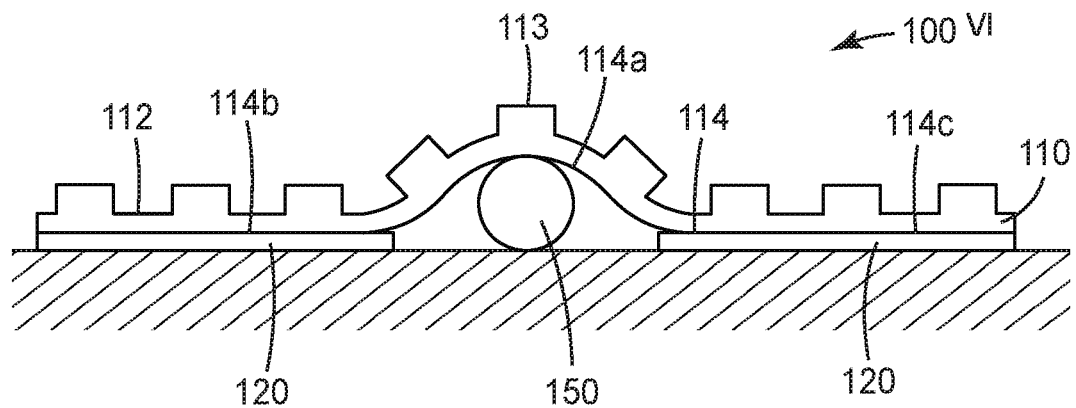

FIG. 1H shows another aspect of the invention, a distribution cabling tape 100$^{vi}$ that includes a resilient polymeric base sheet 110 having a first major surface 114 and a second major surface 112 that comprises a patterned surface 113 having a plurality of raised structures. In alternative aspects, resilient polymeric base sheet 110 can be formed from a single material, or, alternatively, different materials, such as described above. In this embodiment, the first major surface 114 is substantially continuous across the side to side width of the tape 100$^{vi}$. A first portion 114*a* of the surface 114 is not covered with an adhesive layer. First portion 114*a* can accommodate at least a portion of at least one distribution cable, such as cable 150, similar to those described above. In this embodiment, raised structures are present over the tape region covering cable 150. In addition, tape 100$^{vi}$ includes an adhesive layer 120 disposed on a second portion 114b and a third portion 114c of the first major surface 114. The adhesive layer comprises a composition that is capable of adhering to a concrete or asphalt surface, such as a road, curb, or walkway surface, such as road 105 shown in FIG. 1C.

Figure 1I:
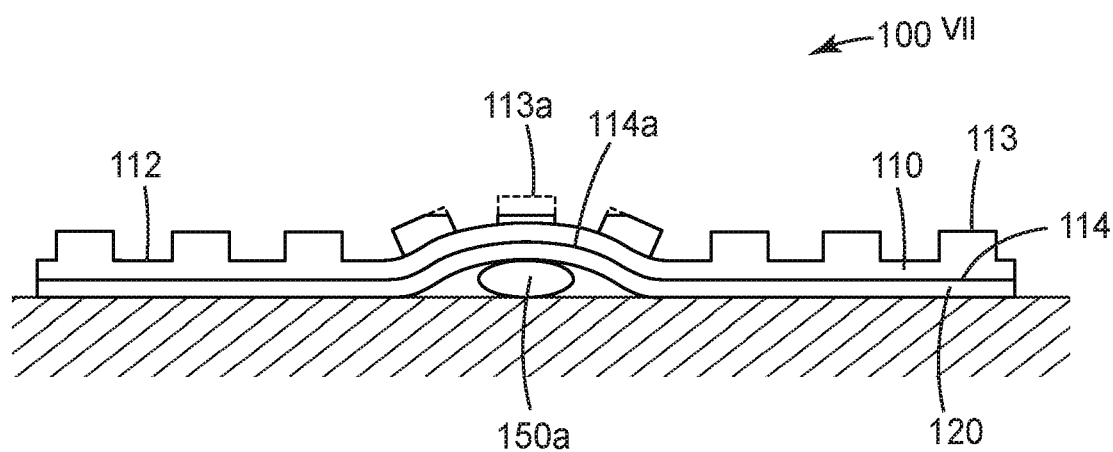

FIG. 1I shows another aspect of the invention, a distribution cabling tape 100$^{vii}$ that includes a resilient polymeric base sheet 110 having a first major surface 114 and a second major surface 112 that comprises a patterned surface 113 having a plurality of raised structures. However, in this aspect, one or more of the raised structures, such as structure 113a, are milled down to provide an overall flatter upper surface. In alternative aspects, resilient polymeric base sheet 110 can be formed from a single material, or, alternatively, different materials, such as described above. In this embodiment, the first major surface 114 is substantially continuous across the side to side width of the tape 100$^{vii}$ and is covered with an adhesive layer 120 that is capable of adhering to a concrete or asphalt surface, such as a road, curb, or walkway surface, such as road 105 shown in FIG. 1C. A first portion 114a of the surface 114 may be covered with an adhesive layer 120. First portion 114a can accommodate at least a portion of at least one distribution cable, such as cable 150a, similar to those described above.

In more detail, applied to the bottom surface 114 of the base sheet 110 is an adhesive 120, such as a pressure sensitive adhesive (PSA). In one aspect, the PSA 120 is designed to adhere to a common road, curb, or walkway surface, such as concrete and asphalt surfaces, and to withstand the wide temperature variations, weather and chemicals present. For example, acceptable PSA formulations are described in U.S. Pat. Nos. 5,906,889 and 5,453,320, each of which is incorporated by reference herein in its entirety. In another aspect, the adhesive can comprise a heat activated adhesive. In addition, other types of adhesives can be used, depending on the duration of the intended deployment of the distribution cabling tape.

The adhesive layer 120 is applied to a resilient base sheet 110. Sheet 110 has a top surface 112 and a bottom surface 114. One or more portions of the bottom surface 114, such as portions 114b and 114c are in contact with the adhesive layer 120. In one aspect, the base sheet 110 can be made from non-crosslinked elastomer precursors. The base sheet 110 is preferably made of a durable construction to withstand continual impacts made by vehicles and/or pedestrians. Acceptable base sheet compositions have been described in, for example, U.S. Pat. Nos. 4,117,192, 4,490,432, 4,282,281, US 2014/0011911, and U.S. Pat. No. 5,853,846, each of which is incorporated by reference herein in its entirety. In one aspect, the base sheet can comprise a thermoplastic material.

In some other aspects, the base sheet can comprise a more conformable material, such that when the distribution cable is inserted in a channel, the channel can conform about an outer shape or profile of the distribution cable, for example, after the distribution cable is inserted in the channel, or after the distribution cable is installed on the road surface. In a further alternative aspect, the base sheet can comprise a fabric material, or a scrim, such as is described in U.S. Pat. Nos. 7,169,831 and 5,981,033, each of which is incorporated by reference herein in its entirety, which can make the distribution cabling tape removable in a straightforward manner, which can be useful in temporary deployment applications, such as for short duration events or in repair applications. In addition, as mentioned above, the base sheet can also comprise a composite of different materials, such as different polymeric materials. For example, a composite base sheet can be formed by coextruding two different polymers, such as a toughened or semi-rigid polymer material and a more flexible elastomeric (lower modulus) material.

The second or top layer 112 of the base sheet 110, may be a flat surface (such as shown in FIG. 1A) or it may have a raised pattern surface 113 (such as is shown in FIG. 1B). The base sheet 110 can be any color so that the tape can stand out (such as including white or yellow coloring) or it can blend into the surface upon which it is mounted (such as including gray or black coloring) or it can be covered with conventional road surfacing or resurfacing materials. Retroreflective elements, glass and/or ceramic beads, can be embedded directly on the second surface 112 as is described in U.S. Pat. No. 4,388,359, which is incorporated by reference in its entirety. Alternatively, the second surface 112 can be coated with either a thermoplastic or thermosetting layer. For flat markings, an example of a thermoplastic material is described in U.S. Pat. No. 4,117,192, which is incorporated by reference in its entirety, and for thermosetting an example material is described in U.S. Pat. No. 5,077,117, which is incorporated by reference in its entirety. For base sheets 110 having a plurality of raised protuberances, example materials are described in U.S. Pat. Nos. 4,988,541, 5,683,746, 5,593,246, 6,479,132, 5,928,761, 5,227,221, and 5,763,000, each of which is incorporated by reference in its entirety. Additionally, other patterns and designs of raised protuberances are described in U.S. Pat. Nos. 4,388,359, 4,988,541, 5,683,746, and 4,681,401, each of which is incorporated by reference in its entirety. For applications where roads may be subject to snow and ice accumulation, exemplary base sheets designed to resist the action of snowplow blades are described in U.S. Pat. Nos. 4,129,673, 4,685,824, and 6,431,788, each of which is incorporated by reference in its entirety. Exemplary commercially available pavement marking tapes include those sold under the Stamark™ brand, including 380 IES and 380 AW models, available from 3M Company, St. Paul Minn.

Acceptable methods of forming a tape structure using the exemplary base sheets and adhesives described herein can include hot embossing, double sided embossing, patterned nip rolls, doctor blading (for adhesives), and pattern coating techniques. For example, patterned embossing rolls can be brought into contact with opposing sides of a web of the base sheet material to generate the desired patterns on each side of the base sheet (e.g., diamonds on the air side (e.g., surface 112) and continuous channel on the road side (e.g., surface 114)). Doctor blades or pattern coating can be used to apply adhesives in non-channel areas.

Figure 2A:
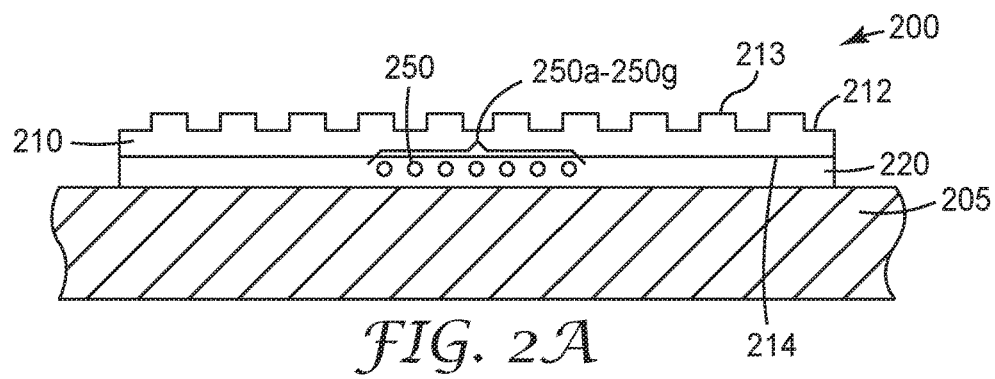
FIGS. 2A-2D are cross section views of additional adhesive backed road surface tapes according to other aspects of the invention.

FIG. 2A shows another aspect of the invention, a distribution cabling tape 200 that includes a resilient polymeric base sheet 210 having a first major surface 214 and a second major surface 212 that comprises a patterned surface 213 having a plurality of raised structures. In this aspect, a distribution cable 250 is embedded in the tape 200. For example, in alternate configurations, the distribution cable 250 can be embedded between the first major surface 214 and the adhesive layer 220, the distribution cable 250 can be embedded within the adhesive layer 220, or the distribution cable 250 can be embedded between the adhesive layer 220 and the road surface 205. Preferably, in this aspect, the distribution cable 250 can be a low profile fiber cable, such as a fiber ribbon cable, having a plurality of optical fibers (in this example, fibers 250a-250g). Although not shown, distribution cable 250 can include additional strength members (e.g., Kevlar yarn or glass fiber rods (FRP)) to help reduce axial strain on the fiber as the road expands and/contracts with daytime heating and seasonal temperature variations. The adhesive layer 220 and the base sheet 210 can be constructed as described above.

Figure 2B:
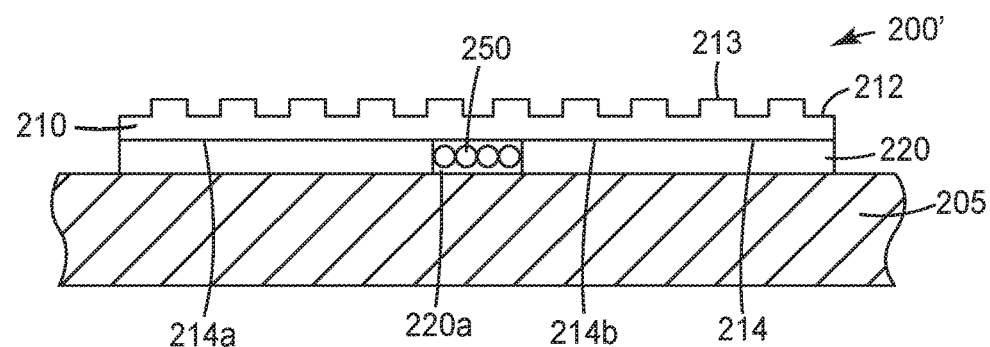

FIG. 2B shows another aspect of the invention, a distribution cabling tape 200' that includes a resilient polymeric base sheet 210 having a first major surface 214 and a second major surface 212 that comprises a patterned surface 213 having a plurality of raised structures. In addition, tape 200' includes an adhesive layer 220 disposed on a first portion 214a and a second portion 214b of the first major surface 214. The adhesive layer comprises a composition that is capable of adhering to an asphalt or concrete surface, such as road, curb, or walkway surface 205. In this aspect, a gap 220a is formed between adhesive sections that is adhesive free and is configured to receive a distribution cable 250, or at least a portion thereof. Preferably, in this aspect, the distribution cable 250 can be a low profile fiber cable, such as a fiber ribbon cable, having a plurality of optical fibers. The adhesive layer 220 and the base sheet 210 can be constructed as described above.

Figure 2C:
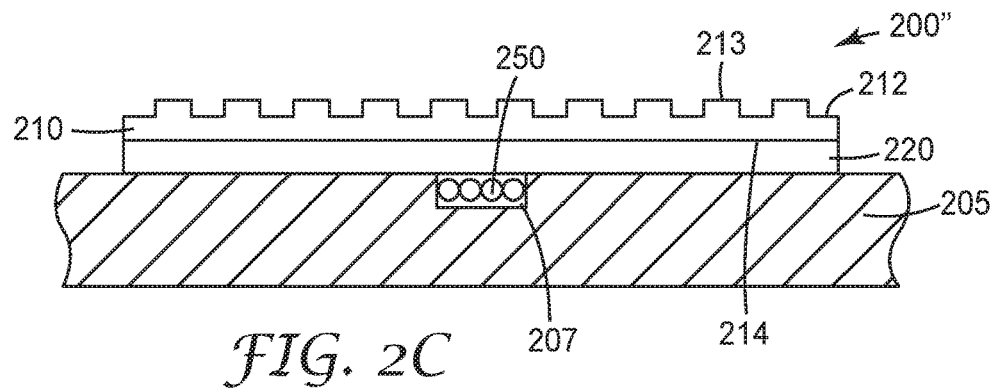

FIG. 2C shows yet another aspect of the invention, a distribution cabling tape 200" that includes a resilient polymeric base sheet 210 having a first major surface 214 and a second major surface 212 that comprises a patterned surface 213 having a plurality of raised structures. In addition, tape 200" includes an adhesive layer 220 disposed on the first major surface 214. The adhesive layer comprises a composition that is capable of adhering to a road, curb, or walkway surface 205. In this aspect, a relatively shallow surface channel 207 is formed in the road, curb, or walkway surface 205. A distribution cable 250 can be received in channel 207 and the tape 200" can be disposed directly above the surface channel 207. The channel 207 can be formed with a conventional road surface grinding tool, such as are available from Smith Manufacturing (Pompano Beach, Fla.). In one example, the surface channel 207 can have a width and depth of about ¼"-1" to receive a conventional fiber drop cable, such as the ROC™ Drop Dielectric Cable (available from Corning Inc., Hickory N.C.). In this aspect, the channel or pathway can have a width and depth sufficient to allow the distribution cable to "float" within the pathway as the road expands and contracts with daytime heating and seasonal temperature changes. Optionally, in addition to the distribution cable 250, in some aspects of the invention, a sealant or adhesive can be applied to the surface channel 207. For example, an added sealant can help prevent water build-up within the surface channel. An exemplary sealant can comprise, for example, Safetrack™ MTI sealant available from StirlingLloyd Polychem Ltd (UK). The adhesive layer 220 and the base sheet 210 can be constructed as described above.

Further, different sections of surface channel 207 can be configured with a different shape, such as a wider channel or trench, so as to accommodate different types of network devices, such as splices or other equipment.

It is noted that if a distribution cable of a certain size were placed under a road surface tape that did not include a channel therein or if there were no channel or trench formed in the road surface, the tape would likely bulge at the cable location. This protrusion would concentrate the tire load onto the distribution cable and would likely cause premature wear of the road surface tape in this region.

Figure 2D:
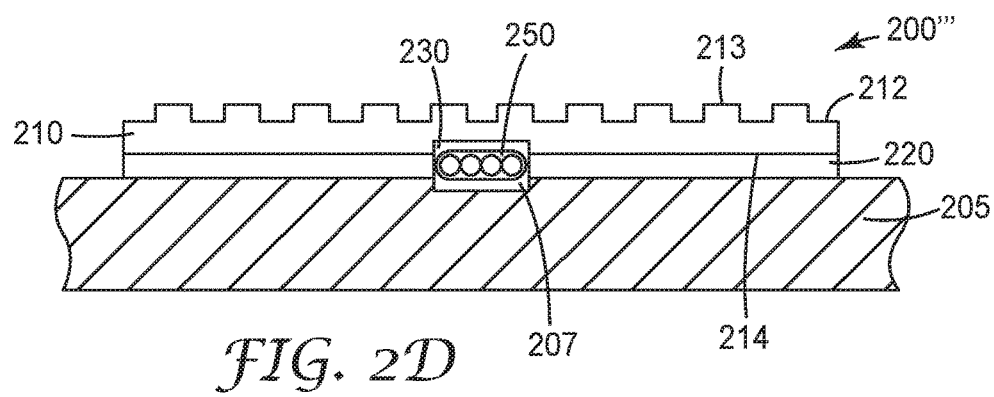

FIG. 2D shows yet another aspect of the invention, a distribution cabling tape 200''' that includes a resilient polymeric base sheet 210 having a first major surface 214 and a second major surface 212 that comprises a patterned surface 213 having a plurality of raised structures. In addition, the first major surface 214 includes a continuous lengthwise channel 230 formed in a first portion thereof. The channel 230 is configured to receive at least a portion of a distribution cable 250. In this aspect, the distribution cable 250 includes one or more electrical lines or optical fibers and can comprise a cable such as those described above. An adhesive layer 220 disposed on the first major surface 214 on one or both sides of channel 230. The adhesive layer comprises a composition that is capable of adhering to a road or walkway surface 205. In this aspect, a relatively shallow surface channel 207 is formed in the road or walkway surface 205. The tape 200''' can be disposed directly above the surface channel 207 such that distribution cable 250 can be received in the spaced defined by channel 230 and channel 207. The channel 207 can be formed with a conventional road surface grinding tool, such as those described above. The adhesive layer 220 and the base sheet 210 can be constructed as described above. Alternatively, as would be apparent to one of skill in the art given the present description, tape 200''' can be further modified to include multiple channels (see e.g., FIG. 1E) and road surface 207 can also include multiple channels, as appropriate.

In a further alternative, a distribution cabling tape that does not include a channel formed in the base sheet and that is adhesive free over a central portion of the first major surface (see e.g., tape 200') can be placed over a road surface channel 207 to provide a protective covering for a distribution cable 250 installed in channel 207.

Figure 3A:
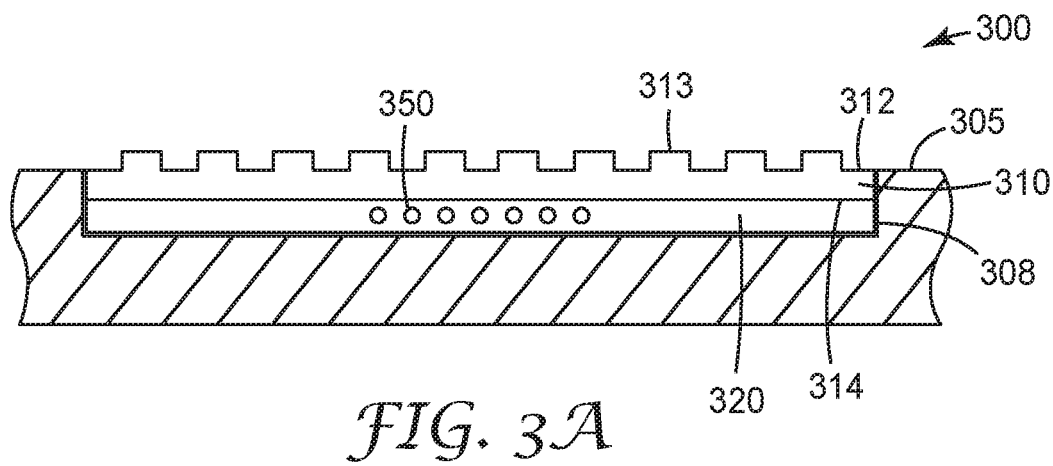
FIGS. 3A-3B are cross section views of additional adhesive backed road surface tapes according to other aspects of the invention.

FIG. 3A shows yet another aspect of the invention, a distribution cabling tape 300 that includes a resilient polymeric base sheet 310 having a first major surface 314 and a second major surface 312 that comprises a patterned surface 313 having a plurality of raised structures. In this aspect, a distribution cable 350 is embedded in the tape 300, such as is described above with respect to FIG. 2A. For example, in alternate configurations, the distribution cable 350 can be embedded between the first major surface 314 and the adhesive layer 320, the distribution cable 350 can be embedded within the adhesive layer 320, or the distribution cable 350 can be embedded between the adhesive layer 320 and the road surface. The adhesive layer 320 and the base sheet 310 can be constructed as described above. Further, in this aspect of the invention, the road surface 305 includes a wide trench 308 that is configured in depth and width to receive the entire width of the tape 300, such that the top surface 312 is substantially at road surface level. In this manner, especially for environments where ice and snow accumulation are common, the tape 300, and thus the distribution cable 350, can be protected from snow plows and other road surface servicing equipment.

Figure 3B:
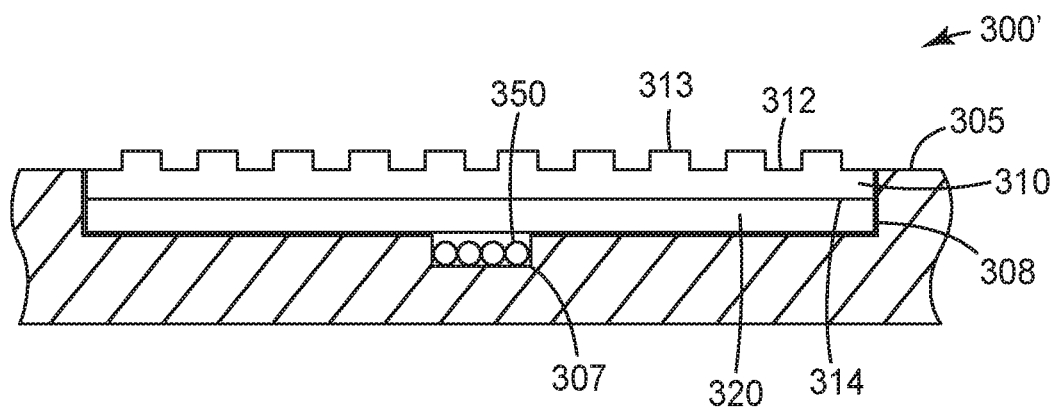

In a further alternative aspect, a distribution cabling tape 300 can be constructed as shown in any of the above tape constructions. For example, as is shown in FIG. 3B, a distribution cabling tape 300' includes a resilient polymeric base sheet 310 having a first major surface 314 and a second major surface 312 that comprises a patterned surface 313 having a plurality of raised structures. In addition, tape 300' includes an adhesive layer 320 disposed on the first major surface 314. The adhesive layer comprises a composition that is capable of adhering to a concrete or asphalt surface, such as a road, curb, or walkway surface 305. In this aspect, the road surface 305 includes a wide trench 308 that is configured in depth and width to receive the entire width of the tape 300', such that the top surface 312 is substantially at road surface level. In addition, a second, narrower shallow channel 307 is formed in the bottom surface of trench 308 such that a distribution cable 350 can be received in channel 307 and the tape 300' can be disposed directly above the channel 307. The trench 308 and channel 307 can be formed with conventional road surface grinding tools. In a further alternative aspect, additional channels or trenches can be utilized to accommodate splices or extra fiber(s) to accommodate strain and future repairs.

Figure 5A:
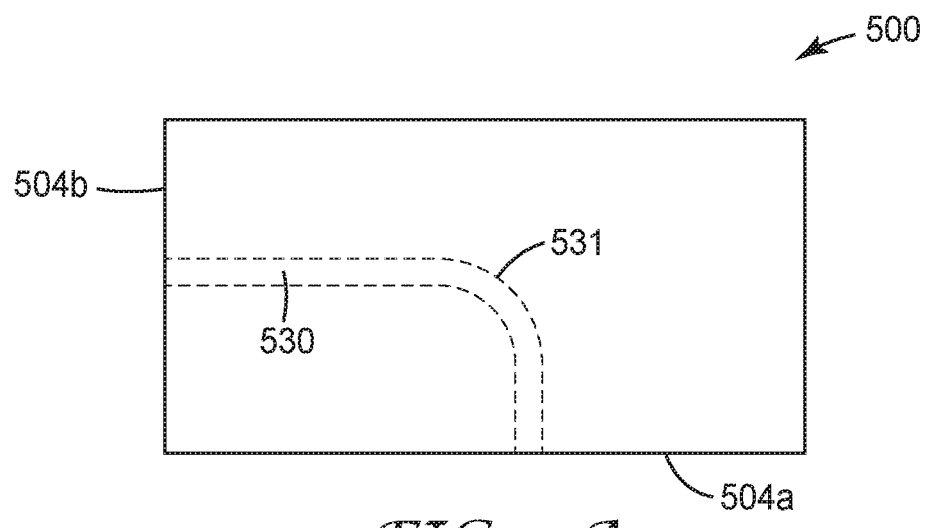
FIGS. 5A-5C are top views of distribution cabling tapes according to different aspects of the invention.

In a further aspect of the invention, a distribution cabling tape can be formed having a curved channel or curved break-out channels to allow for cables to exit the distribution cabling tape in any direction. For example, FIG. 5A shows a distribution cabling tape 500. In this configuration, tape 500 is configured as a patch to accommodate a right angle turn. In this aspect, channel 530, which can be formed in a first major surface of the backing sheet (such as is described previously) can include a curved portion 531, which allows a distribution cable to enter a first side 504a and exit an adjacent side 504b. Alternatively, the channel 530 can be curved at a different angle than a right angle, depending on the cable routing application. Optionally, the road surface can also include a corresponding curved channel.

Figure 5B:
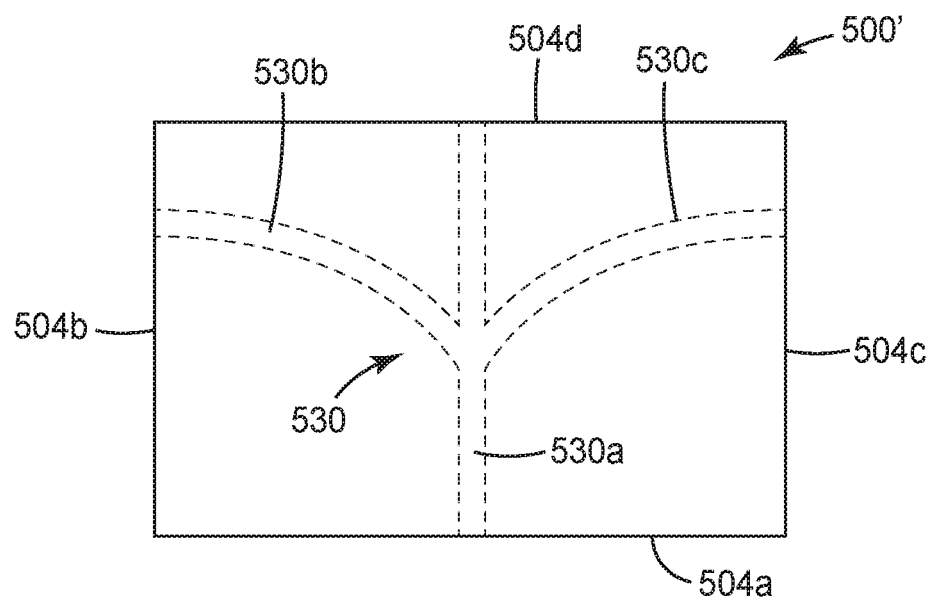
Figure 5C:
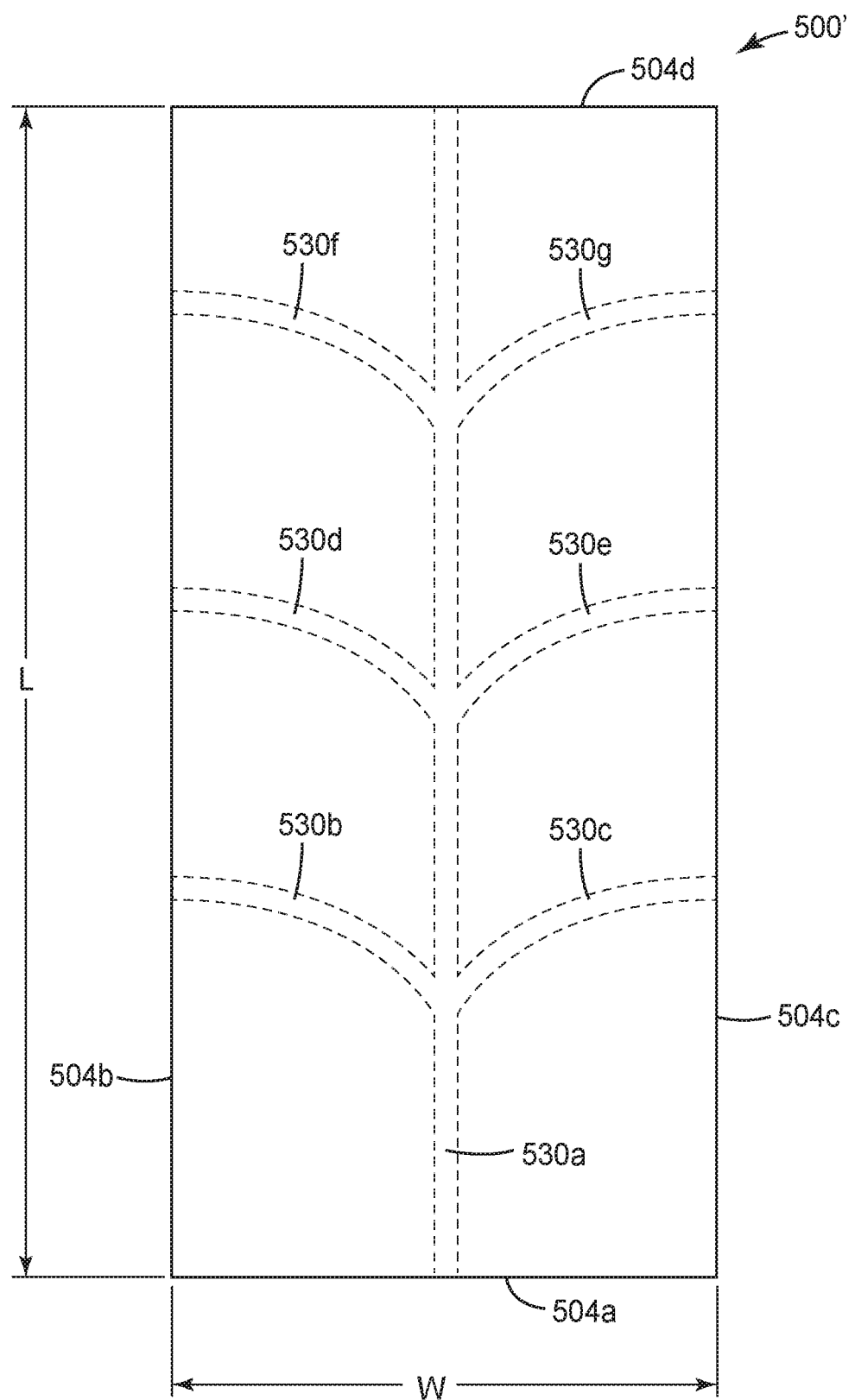

In a further alternative, a distribution cabling tape can include several break-out channels that can allow one or more communication or power lines within the distribution cable to branch out from the main cable. For example, FIGS. 5B and 5C shows a distribution cabling tape 500'. In FIG. 5B, tape 500' is configured as a patch to accommodate one or more branch outs (e.g., substantially right angle turns). In this aspect, the channel 530, which can be formed in a first major surface of the backing sheet (such as is described previously) can include a main channel 530a and multiple branches 530b and 530c. In this configuration, a distribution cable entering a first side 504a can have at least one communication line branch out from the main cable and exit an adjacent side 504b or 504c, with the remainder of the communication lines continuing towards side 504d. In FIG. 5C, tape 500' is configured as a tape having a length L much greater than its width W. In FIG. 5C, tape 500' includes repeating branching sections (three such sections are shown in the figure), with branches 530b-530g providing branching locations for communication lines within the main distribution cable.

Figure 5D:
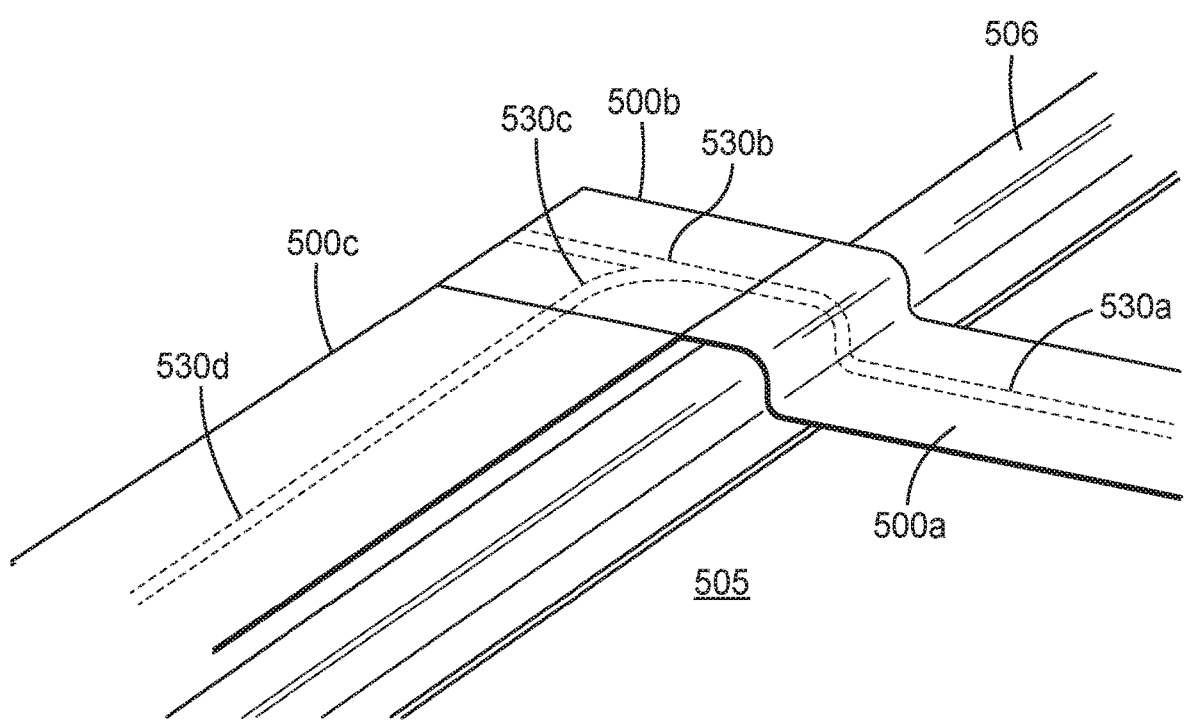
FIG. 5D is an isometric view of distribution cabling tapes according to another aspect of the invention.

In a further aspect of the invention, multiple distribution cabling tapes can be used to route a distribution cable over multiple surfaces. As shown in FIG. 5D, a first distribution cabling tape 500a, a distribution cabling patch 500b, and a second distribution cabling tape 500c can be used to route a distribution cable (not shown) from a road surface 505 across and along a curb 506. For example, a distribution cable can be routed along channel 530a to a patch 500b mounted at curb 506. One or more communication lines can be routed along channel 530b to curved channel 530c and then along channel 530d of distribution cabling tape 500c.

As would be understood by one of ordinary skill in the art given the present description, a cable routing deployment (in a neighborhood or other venue) can use any number of combinations of the distribution cabling tapes and patches described herein. Further, the continuous channels formed in the tapes and road surfaces need not be formed as straight lines. Additionally, the distribution cabling tape or road surface may include a loop shaped channel or trench configured to accommodate slack storage for future repairs.

Figure 4:
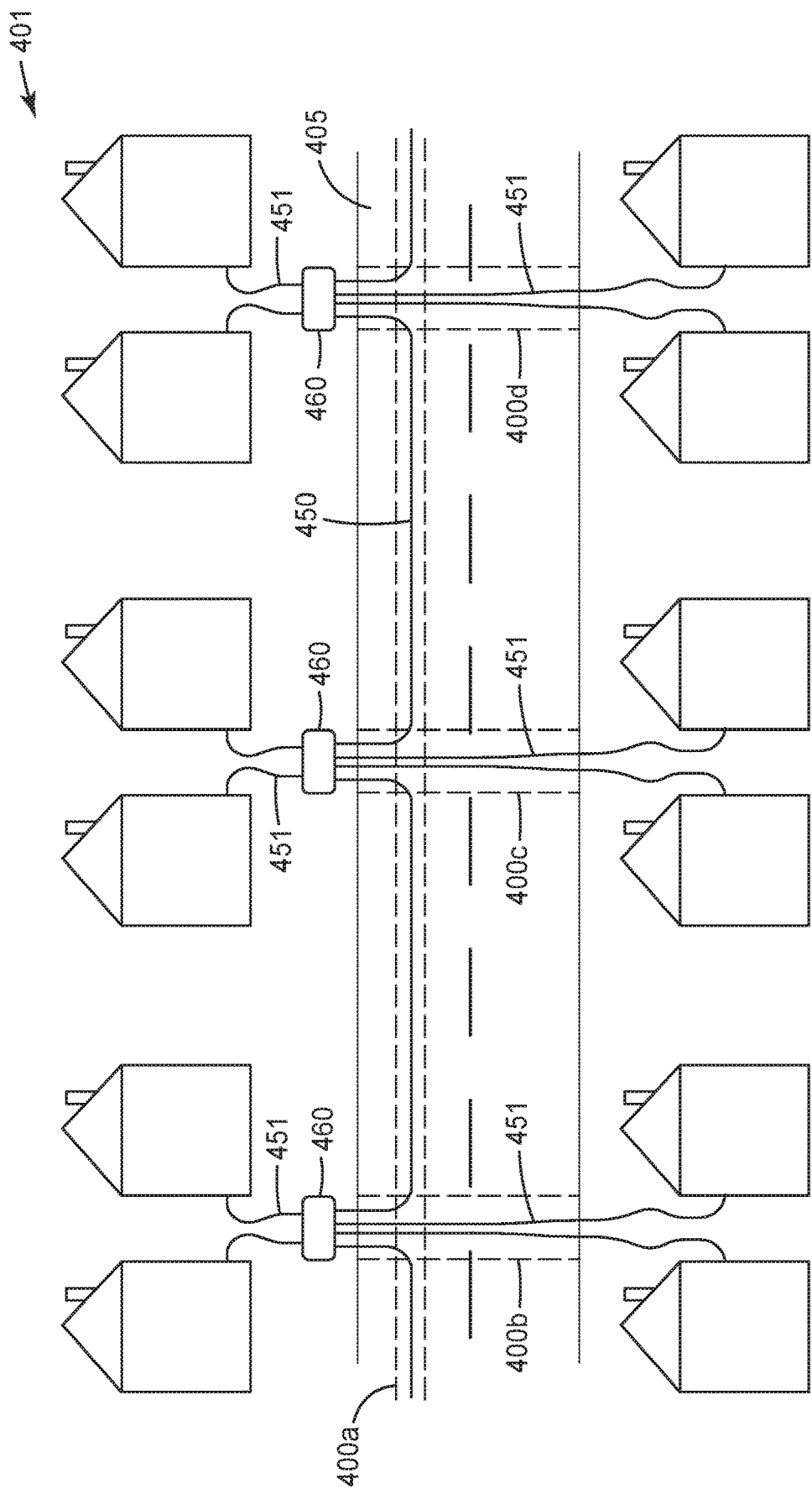
FIG. 4 shows an example FTTh neighborhood network deployment according to yet another aspect of the invention.

The distribution cabling tape embodiments described herein can be employed as part of a fiber access network and provide a cost effective and rapidly deployable alternative to traditional fiber-to-the-home, building, or event site methods. For example, one such application employing the distribution cabling tape embodiments described herein for a communications application is shown in FIG. 4. Network 401 is provided to a neighborhood having a plurality of homes. In this aspect of the invention, the telecommunications cabling can be provided on the road surface using one or more of the road surface conduit structures described above. In this aspect, traditional telecommunications cabling, such as fiber drop cables, can be used in the road surface conduit. Shallow grooves, such as groove 207 described above in FIG. 2C, are ground into the road surface 405 in the pathways shown in FIG. 4. Distribution cable 450 bring fibers from the central office to each terminal 460 using road surface conduit 400a. Inside the terminal, drop cables 451 are connected to the appropriate distribution fiber and run to each home via one or more road surface conduits 400b-400d. In more detail, drop cables 451 that need to run across the street can again be laid in a road surface groove and protected/encased by any of road surface conduits 400b-400d.

In one aspect, the distribution cable 450 can have be a fiber count suitable for a centralized split FTTh architecture (e.g., 144 fiber) or a fiber count suitable for a distributed split FTTh architecture (e.g., 12 fiber). Example fiber cabling includes MiniXtend 144ZM4-T4F22A20 (available from Corning Inc.) that is broken out to single fiber drops in the terminal. A suitable smaller fiber count cable includes Mini LT Flat Drop AT-5BE8T7X-12 (available from OFS) that is power split to the single fiber drops in the terminal. In either case, a conventional drop cable 451 can include a Mini LT Flat Drop AT-5BE8T7X-1 or 2 (available from OFS). The adhesive backed structure or tape 400a-400d can have a durable construction, similar to the backing/adhesive constructions described above. As such, the adhesive backed structure or tape 400a-400d provide cable protection for an extended period of time, even if used on a temporary basis, until a traditional underground conduit is installed. In addition, the distribution cabling tape can be used for repairing faults. For example, if a fault was discovered, the original distribution cabling tape can be removed at the fault location, a repair splice to the line or lines can be made at that location, and a new tape or tape section can be applied to cover the splice or repair.

In addition, it is expected that a road surface may undergo significant shifts and cracks which could severely stress the distribution cable. As such, in some aspects, an excess distribution cable length can be provided during installation. In one example, the cable would purposely be applied with a, e.g., sinusoid pattern so that it has 1-2% excess length. When the road surface shifts, this region of cable would be strained into a sine wave of reduced amplitude, or become substantially straight.

The distribution cabling tape thus allows a service provider the opportunity to quickly connect a sufficient number of customers in a neighborhood or building before making a large infrastructure investment. In this manner, each of the houses in this area of the neighborhood can be rapidly accessed without having to utilize directional drilling or other massive road destruction and repair procedures.

Other applications for the tape constructions described herein can also be implemented. For example, the adhesive backed structure or tape can be configured to further ruggedize drop cable for direct buried applications. The tape can continue off the road and can be wrapped around the drop cable making a robust transition from the road surface to below grade bury of the cable and continuing all the way to the house if deemed necessary. In addition, the road surface conduit can be deployed on a curb adjacent to the street thereby eliminating network disruption when the street is resurfaced. The road surface conduit can be deployed with pre-fabricated distribution cable assemblies (e.g., FlexNap, available from Corning, Inc.) where the access branch point is accommodated in the road surface. An alternative deployment technique can include utilizing a RetractaNet™ cable (available from Prysmian Group, Lexington, S.C.) and one or more window cuts to access one or more of the individual communication lines therein. In addition, the distribution cabling tape embodiments described herein can be used to distribute cabling along other surfaces, such as along or up the side of a building, tower, bridge, or other structures.

While a preferred application of the distribution cabling tape is for telecommunication applications, as mentioned previously, other applications can include pathways for power, sensors or sensing or electronics for smart road applications.

Experiment

In a first experiment, 28 samples of the various configurations described above were prepared in short sections and tested on a vehicle wear simulator (VWS). The VWS can include a drum covered with an appropriate surface material to simulate, e.g., highway pavement. A car tire loaded at 1000 pounds is pressed against the drum. The VWS can be run at about 120 RPM, corresponding to approximately 50 mph, and at a constant temperature (e.g., 35° C.) for about 10 hours to simulate vehicle tire hits.

Samples were applied to the road surfaces with fiber optic cables in the test apparatus. Simulated tire hits over the samples were conducted and fiber continuity was observed at increasing intervals of simulated tire hits. The results from this testing showed no fiber breaks for all of the configurations tested to 1 million tire hits.

In another experiment, a freeze-thaw test was conducted on another sample that was configured in a manner consistent with that shown in FIG. 2C, described above. In this experiment, a concrete block was grooved with a ¼" wide by ¼" deep groove. A section of Corning ROC cable, 001EB1-14701DF9, was laid in the groove and a road surface tape was applied over the cable to encase the fiber optic cable similar to that shown in FIG. 2C. The sample was placed in a metal tub and covered with water. The tub was placed in an environmental chamber from −30° C. freezing conditions to +60° C. thawing conditions. The sample was completely frozen and completely thawed several times with no disruption of the road tape, fiber optical cable or concrete block.

Various modifications, equivalent processes, as well as numerous structures to which the present invention may be applicable will be readily apparent to those of skill in the art to which the present invention is directed upon review of the present specification.

We claim:

1. A distribution cabling tape, comprising:
 a resilient polymeric base sheet having a first major surface and a second major surface, the first major surface being substantially continuous across a side to side width of the tape; and
 an adhesive layer disposed on a second portion and a third portion of the first major surface, the adhesive layer capable of adhering to a concrete or asphalt surface,
 wherein the distribution cabling tape includes wing portions that taper to a narrower base sheet thickness at side ends of the distribution cabling tape;
 wherein the distribution cabling tape includes a continuous lengthwise channel and one or more branching channels extending away from the lengthwise channel; and
 wherein the second major surface comprises a patterned surface having a plurality of raised structures.

2. The distribution cabling tape of claim 1, wherein the resilient polymeric base sheet comprises a composite of at least two different materials.

3. The distribution cabling tape of claim 1, wherein the continuous lengthwise channel is formed in the first major surface.

4. A distribution cabling tape, comprising:
 a resilient polymeric base sheet having a first major surface and a second major surface;
 an adhesive layer disposed on at least a first portion of the first major surface, the adhesive layer capable of adhering to a concrete or asphalt surface; and
 a distribution cable embedded in the distribution cabling tape between the first major surface and a contact surface of the adhesive layer, the contact surface configured to contact the concrete or asphalt surface;
 wherein the distribution cabling tape includes a continuous lengthwise channel and one or more branching channels extending away from the lengthwise channel.

5. The distribution cabling tape of claim 4, wherein the distribution cable is one of embedded between the first major surface and the adhesive layer, embedded within the adhesive layer, and embedded between the adhesive layer and a road, curb, or walkway surface.

6. The distribution cabling tape of claim 4, wherein the distribution cable is embedded in the adhesive layer.

7. The distribution cabling tape of claim 4, wherein the second major surface comprises a patterned surface having a plurality of raised structures.

8. The distribution cabling tape of claim 4, wherein the continuous lengthwise channel is formed in the first major surface.

9. A distribution cabling system, comprising:
 a distribution cabling tape having a resilient polymeric base sheet having a first major surface and a second major surface, the first major surface having a continuous lengthwise first channel formed in a first portion thereof, and an adhesive layer disposed on a second portion of the first major surface, the adhesive layer adhered to a concrete or asphalt surface;
 a second channel formed in the concrete or asphalt; and
 at least one distribution cable at least partially disposed in both the first and second channels.

10. The distribution cabling system of claim 9, wherein the second channel has a width wide enough to receive an entire width of the distribution cabling tape.

11. The distribution cabling system of claim 9, wherein the second channel further includes a sealant material applied therein.

12. The distribution cabling system of claim 9, further comprising a trench formed in the second channel to receive the distribution cable, the second channel having a width sufficient to receive an entire width of the tape.

* * * * *